United States Patent [19]

Takada et al.

[11] Patent Number: 5,001,018
[45] Date of Patent: Mar. 19, 1991

[54] FE-CO BASE MAGNETIC FILM AND PROCESS FOR PRODUCING THE SAME

[75] Inventors: Toshio Takada, Kyoto; Tetsuo Okuyama, Ohtsu; Kenichi Yoden, Isehara; Teruya Shinjo, Uji, all of Japan

[73] Assignees: Kanegafuchi Chemical Industry Co., Ltd., Osaka; TDK Corporation, Tokyo; Nippon Mining Co., Ltd., Tokyo; NEC Corporation, Tokyo; Seisan Kaihatsu Kagaku Kenkyusho, Kyoto, all of Japan

[21] Appl. No.: 414,383

[22] Filed: Sep. 29, 1989

[30] Foreign Application Priority Data

Nov. 25, 1988 [JP] Japan ................. 63-298740

[51] Int. Cl.$^5$ ............................. H01F 10/16
[52] U.S. Cl. ................... 428/611; 428/678; 428/679; 428/681; 428/928
[58] Field of Search ............... 428/611, 678, 679, 681, 428/682, 928

[56] References Cited

U.S. PATENT DOCUMENTS 4,520,076  5/1985  Saito et al. ............... 428/679

FOREIGN PATENT DOCUMENTS 293707  11/1988  Japan ............... 428/611

Primary Examiner—Theodore Morris
Assistant Examiner—George Wyszomierski
Attorney, Agent, or Firm—Wenderoth, Lind & Ponack

[57] ABSTRACT

An Fe-Co base magnetic material comprising periodically laminated structure which consists of an Fe layer which has the bcc (110) plane in the lamination plane, an Fe-Co alloy layer which has the bcc (110) plane in the lamination plane and is laminated on said Fe layer and a Co layer which has the hcp (101) plane in the lamination plane and is laminated on said Fe-Co alloy layer, which laminated structure has controlled magnetostriction.

3 Claims, 2 Drawing Sheets

FE-CO BASE MAGNETIC FILM AND PROCESS FOR PRODUCING THE SAME

BACKGROUND OF THE INVENTION

1. Field of the Invention

The present invention relates to an Fe-Co base magnetic film and a process for producing the same. More particularly, the present invention relates to an Fe-Co base magnetic film which is suitable for a magnetic material which is required to have high saturation magnetic flux density such as a magnetic head and a process for producing such Fe-Co base magnetic film.

2. Description of the Related Art

It is well known that a magnetic head material should have high saturation magnetic flux density to increase a recording density. As the magnetic material with high saturation magnetic flux density, Ni-Fe base alloys, Fe-Al-Si base alloys and the like are provided.

With the progress of technology, in addition to the increase of magnetic flux density, it is desired to improve various properties of the magnetic material. One of such properties is magnetostriction.

An Fe-Co base magnetic material has the highest saturation magnetic flux density among the materials consisting of the transition metals, and it is expected to be used to produce a magnetic head with higher saturation magnetic flux density. However, the magnetostriction of the Fe-Co base magnetic material has not been satisfactorily decreased.

That is, most of the studies on the magnetostriction of the Fe-Co base magnetic material are directed to the variation of alloy composition, and little study has been done on the improvement of magnetostriction from the view point of its lamination structure or other properties.

SUMMARY OF THE INVENTION

One object of the present invention is to provide an Fe-Co base magnetic material in which the magnetostriction is controlled with good reproducibility.

Another object of the present invention is to provide a process for producing an Fe-Co base magnetic material having controlled magnetostriction.

Accordingly, the present invention provides an FeCo base magnetic film comprising periodically laminated structure which consists of an Fe layer which has the bcc (110) plane in the lamination plane, an Fe-Co alloy layer which has the bcc (110) plane in the lamination plane and is laminated on said Fe layer and a Co layer which has the hcp (101) plane in the lamination plane and is laminated on said Fe-Co alloy layer.

DETAILED DESCRIPTION OF THE DRAWINGS

Figure 1:
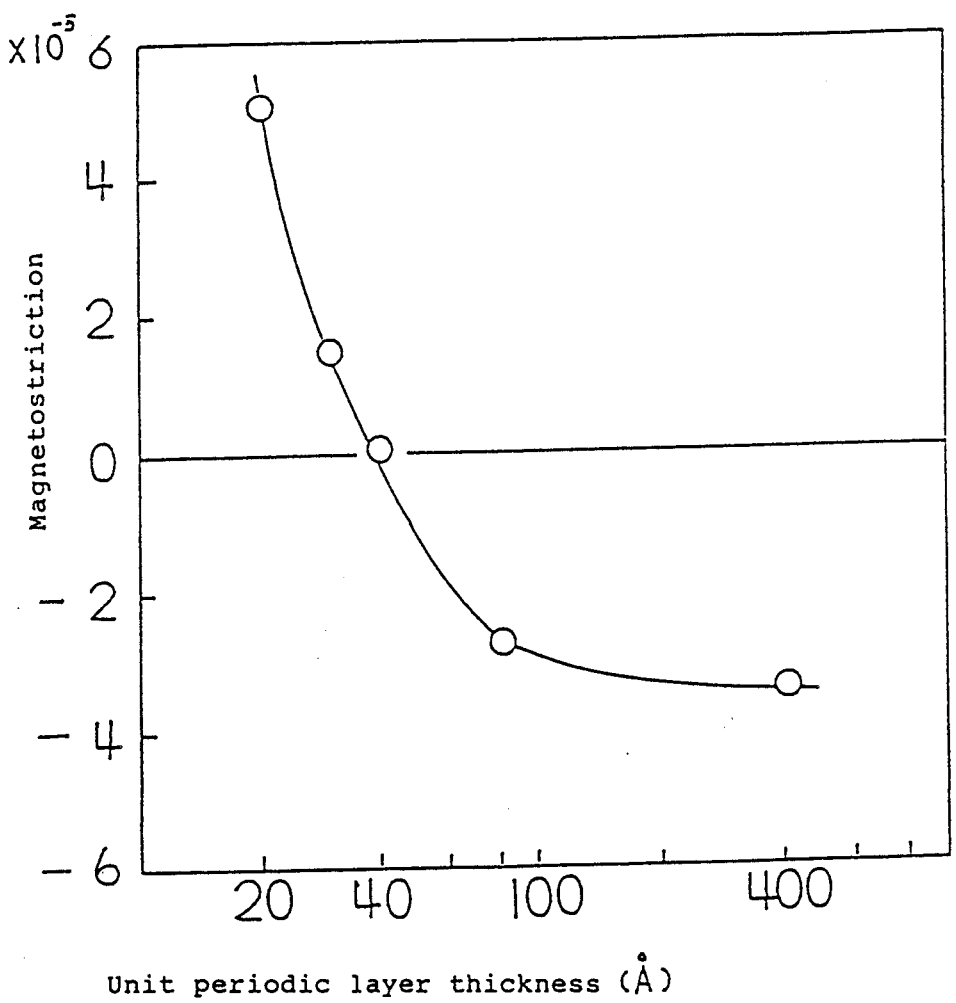
FIG. 1 is a graph showing the magnetostriction of the Fe-Co base magnetic films prepared in Examples 1 to 5.

In the Fe-Co base magnetic material the magnetostriction of which can be controlled, substantially all the lamination planes of the Fe layer and the Fe-Co alloy layer on the Fe layer have the bcc (110) planes in the lamination plane, and substantially all the Co layers have the hcp (101) planes in the lamination plane.

The magnetostriction of the Fe-Co base magnetic material according to the present invention can be controlled by the relationship between the magnetostriction in the negative direction of the Fe layer and the Co layer and the magnetostriction in the positive direction of the Fe-Co alloy layer which is sandwiched between the Fe layer and the Co layer. If any one of the Fe layer, the Fe-Co alloy layer and the Co layer contains a crystal which grows in a direction different from the above direction, the magnetostriction in the layer containing such crystal cannot be predicted, so that the magnetostriction of the Fe-Co base magnetic material as a whole cannot be controlled.

It is desired that the magnetic film have zero magnetostriction through control of the thickness of the layers. In the present invention, the Fe-Co base magnetic material has zero magnetostriction, when each of the Fe layer and the Co layer has a thickness of not larger than 50 Å, particularly when each unit periodic layer, namely, a unit laminate consisting of one Fe layer, one Fe-Co layer and one Co layer, has a thickness of not larger than 35 Å.

The Fe-Co base magnetic material of the present invention can be produced by a process comprising vacuum depositing iron and cobalt alternatively on a substrate under such condition that a ratio of the thickness of the Co layer to the sum of the thicknesses of the Fe layer and the Co layer is not larger than 0.8 [Co layer thickness/(Fe layer thickness + Co layer thickness) $\leq 0.8$].

As the substrate, any material can be employed that will not interfere with the growth of iron with its bcc (110) plane in the lamination plane. Since iron crystal tends to grow so that its bcc (110) plane forms the lamination plane, an amorphous material such as a glass plate or a polyimide film may be used as the substrate.

Different from iron, since cobalt tends to grow so that its hcp (001) plane forms the lamination plane, the thickness of the Co layer should be adjusted to satisfy the above ratio so that substantially all cobalt crystal grows with its hcp (101) plane in the lamination plane.

The Fe-Co alloy layer is formed from a part of the Fe layer and a part of the Co layer which are formed to satisfy the above requirement for the thickness ratio, and its bcc (110) plane spontaneously forms the lamination layer of the Fe-Co layer.

According to the present invention, three lattices are epitaxially grown in the direction of film thickness. The above requirement for the thickness ratio is necessary to epitaxially grow three layers so as to produce the Fe-Co base magnetic material having the above structure.

The vacuum deposition of iron and cobalt is suitable for the epitaxial growth. Preferably, the vacuum deposition is carried out in ultra high vacuum as in the Examples described below at a substrate temperature of room temperature or lower, preferably 0° C. or lower. The vacuum of $10^{-3}$ torr. which is employed in ion beam spattering is not sufficient for the vacuum deposition of iron and cobalt according to the present invention. Thus, in the present invention, the pressure should be better than $10^{-6}$ torr., for example on the order of $10^{-6}$ to $10^{-8}$ torr.

PREFERRED EMBODIMENTS OF THE INVENTION

The present invention will be illustrated by following Examples.

EXAMPLES 1-5

In the vacuum vessel the base pressure of which was in the $10^{-10}$ torr. order and the vacuum of which during deposition was maintained in the $10^{-8}$ torr. order, iron and cobalt were alternatively deposited under the following conditions to form an Fe-Co base magnetic film:

Substrate: Glass plate
Substrate temperature: $-50°$ C.
Fe layer thickness/Co layer thickness: 1:1
Thickness of the unit laminate: 20 Å, 30 Å, 40 Å, 80 Å or 400 Å

According to the above procedures, five films each having the total thickness of 2400 Å, 1200 Å, 1400 Å, 1200 Å and 2400 Å were produced and their magnetostriction was measured. The results are shown in FIG. 1. When the unit laminate thickness was 40 Å, zero magnetostriction was achieved.

The X-ray diffraction at small angles confirmed that the produced Fe-Co base magnetic layers had the artificial periodicity. Further, the X-ray diffraction confirmed that the crystal in the Fe and Co layers grew so that the above specific plane formed the lamination planes.

To measure the thickness of the Fe-Co alloy layer, the Mössbauer effect of the $^{57}$Fe nuclei was measured. It was confirmed that the Fe-Co alloy layer having about 10 Å was formed irrespective of the thickness of Fe layer.

With the above five Fe-Co base magnetic films, saturation magnetization and coercive force were measured. The saturation magnetization varied in the range between 1500 emu/cc and 1800 emu/cc, and the Fe-Co base magnetic film having the higher content of the Fe-Co alloy layer had the larger saturation magnetization. The coercive force was about 10 Oe.

EXAMPLES 6 and 7

In the same manner as in Examples 1 to 5, two kinds of the Fe-Co base magnetic films were produced, one of which had the Fe layer of 29 Å in thickness and the Co layer of 32 Å in thickness (total thickness of 610 Å) (Example 6) and the other of which had the Fe layer of 14 Å in thickness and the Co layer of 19 Å in thickness (total thickness of 330 Å) (Example 7).

Figure 2:
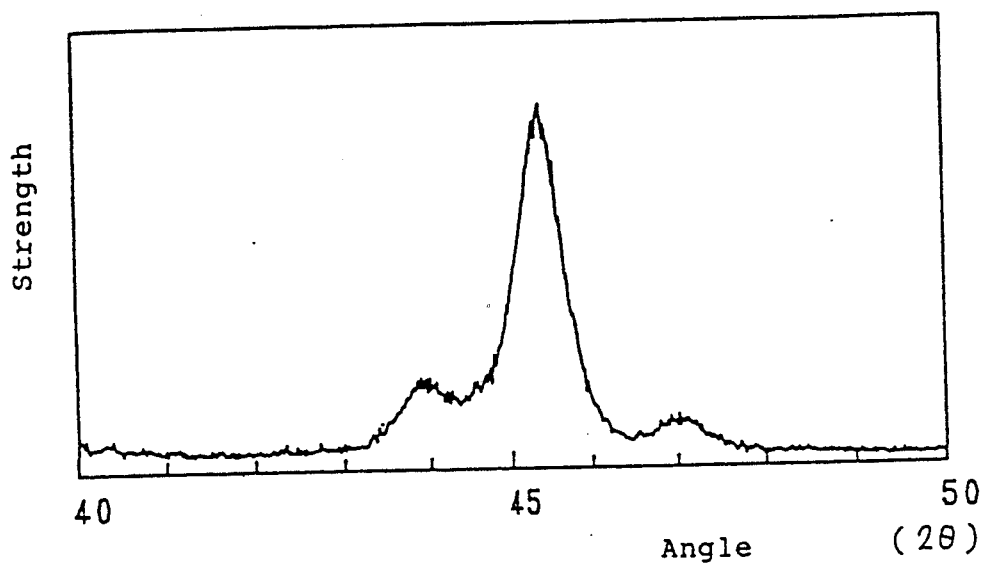
FIGS. 2 and 3 show X-ray diffraction patterns of the Fe-Co base magnetic materials prepared in Examples 6 and 7, respectively.
Figure 3:
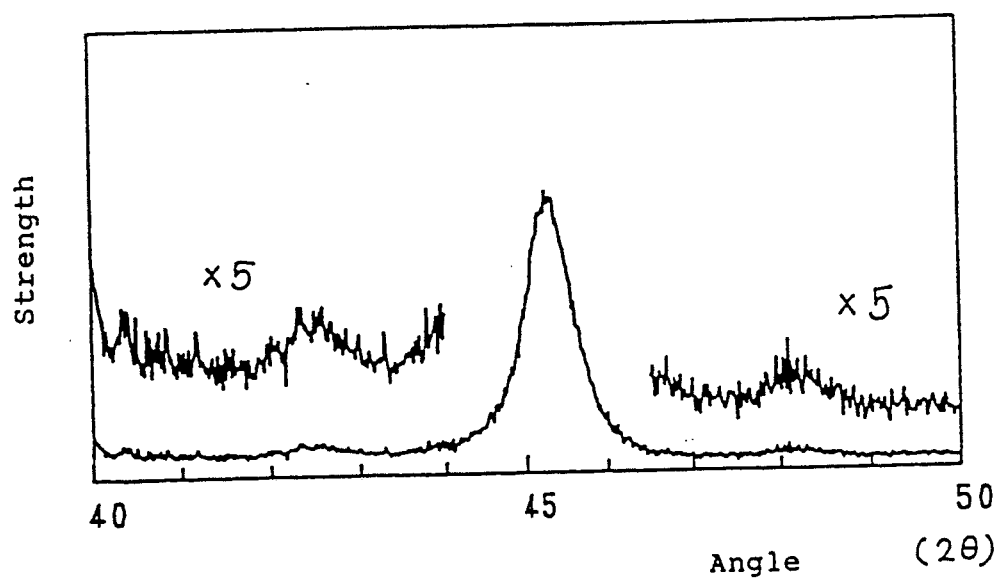

The X-ray diffraction patterns of the magnetic films produced in Examples 6 and 7 are shown in FIGS. 2 and 3, respectively. The patterns indicate that each layer was grown so that the above specific plane formed the lamination plane.

According to the present invention, through the control of the thicknesses of the Fe layer and the Co layer, the Fe-Co base magnetic film having the designed magnetostriction can be produced.

In addition, by the modification of the present invention, it is possible to laminate a thin film of other materials such as SiO between the adjacent unit laminates each consisting of the Fe layer, the Fe-Co alloy layer and the Co layer, whereby the magnetic material having the higher magnetic permeability may be produced.

What is claimed is:

1. An Fe-Co base magnetic film comprising a substrate having at least one laminated film thereon each of said laminated films consisting of an Fe layer which has the bcc (110) plane in a lamination plane, an Fe-Co alloy layer which has the bcc (110) plane in a lamination plane and is adjacent to said Fe layer and a Co layer which has the hcp (101) plane in a lamination plane and is adjacent to said Fe-Co alloy layer.

2. A Fe-Co base magnetic film according to claim 1, wherein each of the Fe layer and the Co layer has a thickness of not larger than to 50 Å.

3. A Fe-Co base magnetic film according to claim 1, wherein the sum of the thicknesses of the Fe layer, the Fe-Co alloy layer and the Co layer adjacent to each other is not smaller than 35 Å.

* * * * *